United States Patent [19]

Tidwell

[11] 4,354,637
[45] Oct. 19, 1982

[54] SELF-PROPELLED REVERSIBLE IRRIGATION MACHINE

[76] Inventor: Hubert Tidwell, 530 W. 200 South, Price, Utah 84501

[21] Appl. No.: 227,741

[22] Filed: Jan. 23, 1981

[51] Int. Cl.³ .............................................. B05B 3/18
[52] U.S. Cl. ..................................... 239/184; 180/22; 180/79; 239/199; 280/47.16
[58] Field of Search ............... 239/178, 180, 181, 183, 239/184, 186, 188, 189, 191, 192, 195, 197, 198, 199, 709, 711, 721; 280/47.16; 180/21, 22, 79

[56] References Cited

U.S. PATENT DOCUMENTS 2,892,466  6/1959  Stilwell et al. .................... 180/21 X
3,009,645  11/1961  Nugent ........................... 239/184 X
3,175,635  3/1965  Bryan .............................. 239/721 X
4,230,275  10/1980  Tidwell ............................ 239/184

Primary Examiner—Andres Kashnikow
Attorney, Agent, or Firm—B. P. Fishburne, Jr.

[57] ABSTRACT

Oppositely turning continuously driven front and rear traction wheels are carried on a common frame which is rockable on a transverse axis with respect to wide stance carriage wheels. A hose reel located centrally on the rockable frame is driven in rotation about a vertical axis by a power take-off from the drive of the traction wheels. A reversing weight is held by gravity in a first operative position to depress one traction wheel while elevating the other traction wheel. Following contact with an obstruction, the weight is dislodged and slides to a second operative position for depressing the other traction wheel and elevating the previously depressed traction wheel.

6 Claims, 4 Drawing Figures

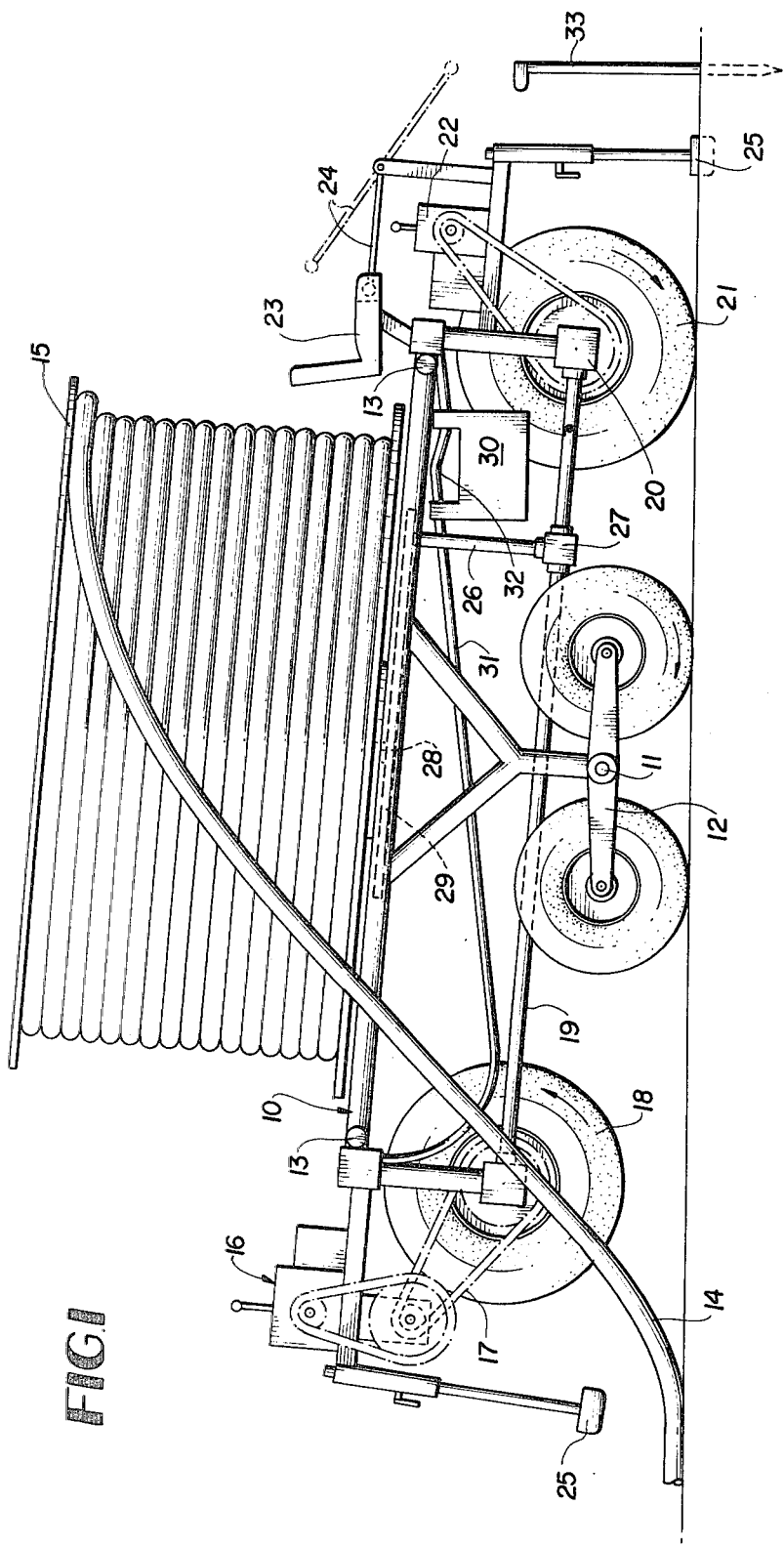
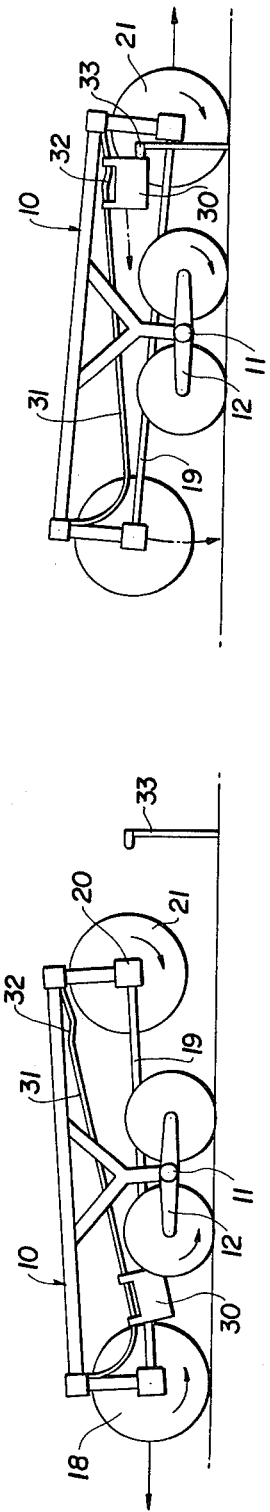

SELF-PROPELLED REVERSIBLE IRRIGATION MACHINE

BACKGROUND OF THE INVENTION

The present invention relates to that type of irrigation machine shown in U.S. Pat. No. 4,230,275 to Tidwell and comprises an improvement thereon and a simplification thereof.

In accordance with this invention, a self-propelled and essentially self-steering irrigation machine carrying a large hose reel whose hose can be coupled to a fixed source of water traverses a field of crops and has the ability to reverse its direction of travel automatically upon reaching the ends of crop rows or a field boundary. The reversal means are gravity assisted and set into operation merely by contact of a reversing weight with a fixed abutment element which can be provided at the ends of crop rows. The reversing weight is supported on an inclined trackway fixed to a frame which is rockable on a transverse axis relative to wide stance dolly or carriage wheels. Traction wheel units are mounted at each end of the rockable frame and are powered continuously in rotation in opposite directions by a simplified drive system which includes a take-off to operate the vertical axis hose reel so that the hose may be wound up during reverse passes of the machine and paid out during forward passes. A higher speed drive for one traction wheel is provided for off-field and turning operations. The machine can be steered by a walking attendant or a seated rider and the steering handle can be locked in a straight ahead position. Furrow following guide shoes which are retractable are also provided for use in the self-steering mode.

BRIEF DESCRIPTION OF THE DRAWINGS

FIG. 1 is a side elevation of a self-propelled reversible irrigation machine according to the invention.

FIGS. 3 and 4 are reduced scale diagrammatic side elevations depicting the automatic reversal means for the machine.

DETAILED DESCRIPTION

Figure 2:
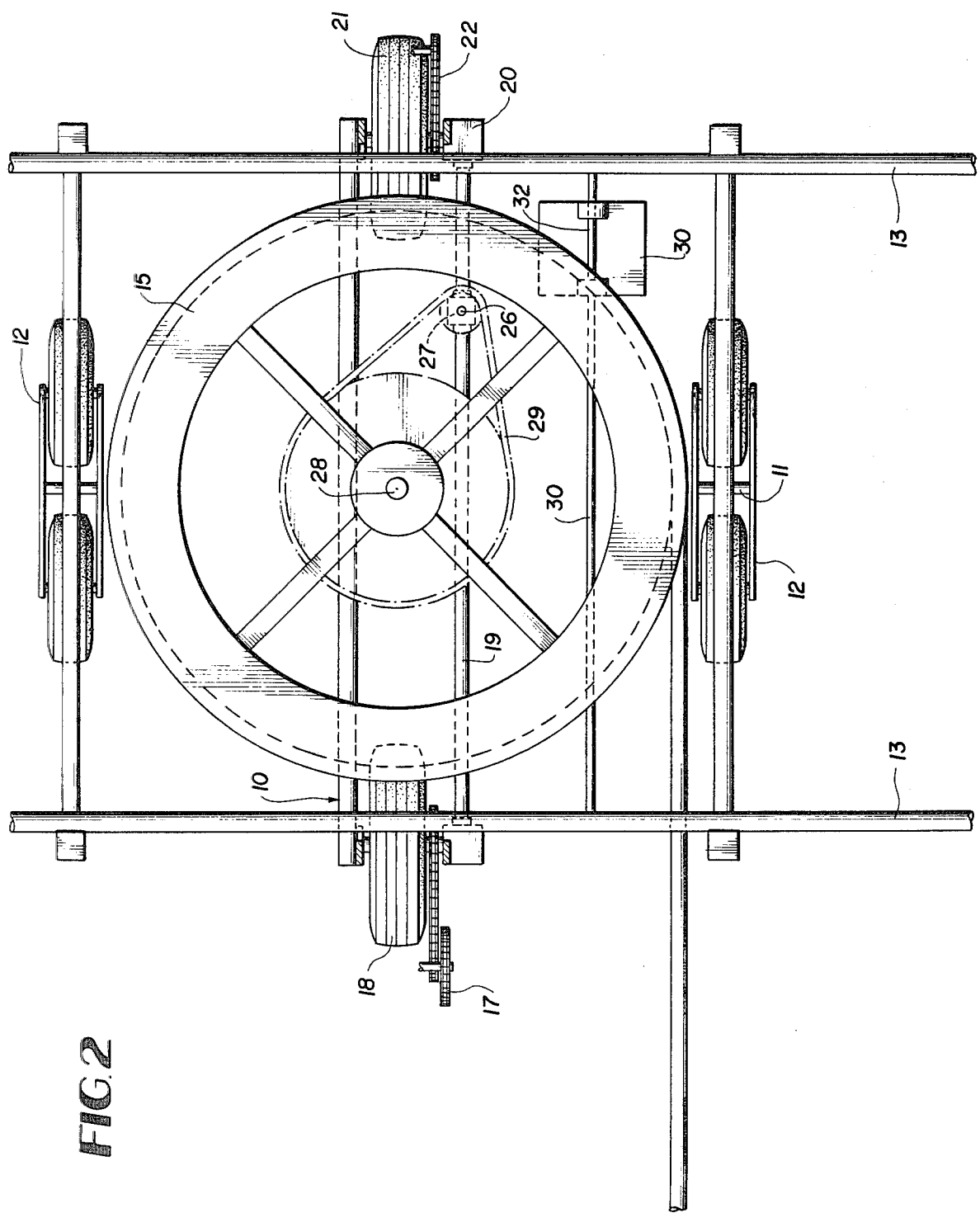
FIG. 2 is a fragmentary plan view thereof with parts omitted and parts in section.

Referring to the drawings in detail, wherein like numerals designate like parts, a rigid support frame 10 is rockably mounted on a transverse rocker axis 11 relative to widely spaced dual wheel dollies or carriages 12 which can straddle several rows of crops. Near its opposite ends, the rockable frame carries at least a pair of transverse parallel irrigation booms 13 which deliver streams of water onto multiple crop rows in the exact manner shown and described in U.S. Pat. No. 4,230,275. The irrigation water is delivered to the two booms 13 from a hose 14 connected with a fixed water source. The hose 14 is coiled on a large diameter vertical axis hose reel 15 driven in a manner to be described. The reel attached terminal of the hose feeds water to hollow portions of the frame 10 which in turn communicate with the booms 13 forming integral parts of the rockable frame, as disclosed in the prior art including U.S. Pat. No. 4,230,275.

At one end thereof, a slow speed power drive 16 is connected through gearing 17 with a rear traction wheel 18 of the machine which is continually turned in one direction. A longitudinal drive shaft 19 extending from the gearing 17 is coupled at its forward end to additional gearing 20 which causes continuous rotation of a front traction wheel 21 in a direction opposite to the rotation of the rear traction wheel. Both traction wheels are continuously driven from the rear drive 16.

A front higher speed drive 22 for the machine independent from the rear drive 16 is mounted on the forward end of rockable frame 10 and includes conventional clutch controls whereby the traction wheel 21, when depressed, can be driven at higher speeds for off-field operations and turning the machine at the ends of crop rows, etc.

A driver's seat 23 is also provided at the front end of frame 10, conveniently located in relation to a steering arm 24 which can be operated optionally be a seated driver or a walking attendant to steer the machine. The steering arm 24 can be locked to the seat 23 in a straight ahead steering position, as shown in FIG. 1. Self-steering for the machine is also enabled by a pair of retractable furrow following shoes 25 carried by the opposite ends of the rockable frame 10.

A rising power take-off shaft 26 coupled with the shaft 19 through gearing 27 is eccentrically located relative to the vertical axis 28 of hose reel 15 and drivingly connected with the hose reel by belt gearing 29 or equivalent means. When the machine is traveling in a forward mode, FIGS. 1 and 3, the hose which is attached to a fixed water supply pays out automatically. When the machine moves rearwardly, FIG. 4, the hose is reeled in by rotation of the reel 15. Conventional clutch controls are provided in accordance with the prior art for this purpose.

In accordance with the dominant feature of the invention, a gravity assisted machine reversal means includes a reversing weight 30 suspended slidably on an inclined guide bar or track 31 attached fixedly to the rockable frame 10 and spaced laterally from the hose reel axis 28, FIG. 2. The inclined track 31 extends in the fore and aft direction relative to the path of movement of the machine. Near its forward end, the track 31 includes a rise 32 which serves to hold the reversing weight 30 in a forward operative position causing the front traction wheel 21 to be depressed into contact with the ground. The frame 10 can tilt or rock on the transverse axis 11 of dollies 12 to permit this.

Abutment posts or stakes 33 are conveniently installed near the ends of crop rows in the path of movement of the reversing weight 30, FIGS. 1 and 3, when the machine travels forwardly. Upon contact with the weight 30 by the abutment post 33, the weight is released from the rise 32 and begins to slide down the inclined bar or track 31 which is divergent from the frame 10 which is now tilted to enable contact of the traction wheel 21 with the ground. As the weight 30 reaches the rearward end of track 31 on the opposite side of rocker axis 11, the frame 10 will be tilted automatically to elevate the traction wheel 21 and depress the rear traction wheel 18 into contact with the ground. This will automatically reverse the direction of travel of the machine which is now powered in a reverse direction by the rear traction wheel 18, as both traction wheels continue to be driven in opposite directions.

When the reverse pass of the machine is completed, the weight 30 is returned manually to the position shown in FIG. 3 for depressing the front traction wheel 21 and is again held by the rise 32. At the end of the reverse pass, the stakes 33 can be relocated and the machine can be driven and steered to a new location relative to additional crop rows by utilization of the higher speed drive 22 and steering means 24. The steering mechanism and power drive details are entirely conventional and need not be detailed for a proper understanding of the invention.

The invention is characterized by extreme simplicity of construction, convenience and reliability of operation, minimal maintenance, and comparative economy of manufacture. Its many advantages should now be apparent to those skilled in the art.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. An irrigation machine comprising a wide stance carriage means, a rockable support frame on the carriage means extending forwardly and rearwardly of a transverse rocker axis on the carriage means, front and rear traction wheels on the rockable support frame on opposite sides of said rocker axis, power drive means on said support frame to drive both of the traction wheels in unison and in opposite directions, irrigation water delivery means on the support frame adapted for connection with a stationary source of water, an inclined front-to-rear track element on the support frame extending forwardly and rearwardly of said rocker axis, and a reversing weight engaged with the track element and adapted to travel rearwardly therealong under the influence of gravity following engagement of the weight with an abutment in the path of movement of the weight when the machine is traveling in one direction, the track element including a weight retaining portion near the forward end of the rockable support frame causing the weight to depress the front traction wheel of the machine and elevate the rear traction wheel.

2. An irrigation machine as defined in claim 1, and the irrigation water delivery means including a vertical axis hose reel centrally located on the rockable support frame, and means including a take-off from said power drive means operatively connected to the hose reel to rotate the hose reel around its vertical axis.

3. An irrigation machine as defined in claim 1, and an independent higher speed power drive means for at least the front traction wheel of the machine on the rockable support frame to facilitate turning and off-field operations of the machine.

4. An irrigation machine as defined in claim 1, and steering means for at least the front traction wheel on the rockable support frame and being lockable in a straight ahead steering position.

5. An irrigation machine as defined in claim 1, and the reversing weight being slidably suspended from the track element and said weight retaining portion consisting of a rise in the track element near its forward end.

6. An irrigation machine as defined in claim 2, and the irrigation water delivery means comprising at least one transverse elongated multiple crop row spanning irrigation boom on the rockable support frame.

* * * * *